(12) United States Patent
Tang

(10) Patent No.: US 6,965,478 B2
(45) Date of Patent: Nov. 15, 2005

(54) MICROLENS ARRAYS

(76) Inventor: Yin S. Tang, 201 Rockview, Irvine, CA (US) 92612

( * ) Notice: Subject to any disclaimer, the term of this patent is extended or adjusted under 35 U.S.C. 154(b) by 67 days.

(21) Appl. No.: 10/758,989

(22) Filed: Jan. 16, 2004

(65) Prior Publication Data
US 2005/0152043 A1 Jul. 14, 2005

Related U.S. Application Data

(63) Continuation-in-part of application No. 10/754,365, filed on Jan. 8, 2004.

(51) Int. Cl.⁷ .................. G02B 27/10; C03B 23/22; B29D 11/00
(52) U.S. Cl. .................. 359/626; 65/37; 264/1.1
(58) Field of Search .................. 65/37, 433; 264/1.1, 264/1.34, 1.36, 2.6; 359/619, 620, 626; 385/115, 385/116, 120

(56) References Cited

U.S. PATENT DOCUMENTS

| 4,541,727 A | 9/1985 | Rosenthal .................. 368/232 |
| 6,129,866 A | 10/2000 | Hamanaka et al. .......... 264/1.7 |
| 6,335,828 B1 | 1/2002 | Hashimoto et al. ......... 359/443 |
| 6,582,988 B1 | 6/2003 | Hsiao et al. .................. 438/70 |
| 6,654,174 B1 | 11/2003 | Huang ........................ 359/619 |

OTHER PUBLICATIONS

B. Volckaerts et al., *The Fabrication of Cylindrical Micro-Lens Arrays with Deep Lithography with Protons*, Cyclotron Department VUB, Laarbeeklaan 103, 1090 Brussels, Belgium.

Primary Examiner—David N. Spector
(74) Attorney, Agent, or Firm—MacPherson Kwok Chen & Heid LLP; Greg J. Michelson

(57) ABSTRACT

Systems and methods for providing a light controlling structure, generally referred to as a microlens or microlens array. For example, in accordance with an embodiment of the present invention, a light controlling structure may be employed to provide a display screen.

31 Claims, 12 Drawing Sheets

MICROLENS ARRAYS

CROSS-REFERENCE TO RELATED APPLICATIONS

This application is a continuation-in-part of U.S. application Ser. No. 10/754,365, entitled "Method for Making Micro-Lens Array" and filed Jan. 8, 2004, which is incorporated herein by reference in its entirety.

TECHNICAL FIELD

This invention relates generally to optics and optical devices and more particularly to microlens arrays, methods for making microlens arrays, and microlens array systems and applications.

BACKGROUND

Microlens arrays provide optical versatility in a miniature package for imaging applications. Traditionally, a microlens is defined as a lens with a diameter less than one millimeter; however, a lens having a diameter as large as five millimeters or more has sometimes also been considered a microlens.

There are many conventional methods for manufacturing microlenses. For example, one commonly used technique for manufacturing microlenses begins by coating a substrate with a selected photoresist, exposing the photoresist coated substrate to radiation through a mask, or alternatively, subjecting the photoresist to gray scale laser exposure. Upon heating the substrate, the exposed photoresist melts and surface tension pulls the material into the form of convex lenses. The depth of the photoresist determines the focal length of the lens.

Another method for the manufacture of microlenses is to use ion exchange. In this method, ions are diffused into a glass rod to give a radial refractive index distribution. The index of refraction is highest in the center of the lens and decreases quadratically as a function of radial distance from the central axis. Microlenses made using the ion exchange method are used to collimate light from fibers as, for example, in telecommunication applications.

In general for many applications, microlens arrays are preferred over discrete microlenses. As an example, one manufacturing process for the production of glass microlens arrays generally involves reactive ion etching (RIE) of fused silica. In general, it is very difficult to meet all the requirements of microlens arrays using RIE. The RIE technology involves many steps before the final product can be produced and thus the yield is typically poor and the products are costly.

As another example, compression molding of optical quality glass to form microlens arrays is also well known. This method includes compressing optical element preforms, generally known as gobs, at high temperatures to form a glass lens element. In the compression molding process, a gob is inserted into a mold cavity. The mold resides within an oxygen-free chamber during the molding process. The gob is generally placed on the lower mold and heated above the glass transition temperature and near the glass softening point. The upper mold is then brought in contact with the gob and pressure is applied to conform the gob to the shape of the mold cavity. After cooling, the lens is removed from the mold.

Unfortunately, compression molding an array of microlenses using one or more preforms is subject to many difficulties, which may include alignment of mechanical and optical axes of each lens element with respect to a common axis and location of each lens element with respect to a reference point in the array. Furthermore, it is extremely difficult to machine convex aspheric mold cavities using conventional techniques if the microlens diameter is less than 1 mm.

As another example, microlens arrays are often formed on the top surface of silicon chips, either for light-sensitive (e.g., CCDs) or light-emitting (e.g., micro-display devices) applications. A planarization layer is first formed over the silicon substrate. A color filter layer is next formed over the planarization layer with sub-pixel areas properly aligned with active devices in the silicon substrate. Another planarization layer is generally formed over the color filter layer and, finally a photoresist material is deposited over the second planarization layer. Conventional lithographic techniques are then utilized to form rectangular patterns in the photoresist. After exposure, a development step removes the photoresist in the exposed areas leaving the central island regions over the pixel-active areas transparent. Development and sometimes etching, removes the photoresist material between these central regions and forms trenches in the photoresist area separating the islands of photoresist now defining the individual microlens sites. A deep plasma etch into the silicon substrate next removes all layers above the substrate. Photoresist is then stripped and the devices are hard-baked to reflow the micro lenses into the proper optical form by controlling time and temperature.

Although there are many conventional methods for producing microlenses and microlens arrays, these conventional techniques may involve difficult or expensive manufacturing steps or fail to meet certain design requirements, such as for example in terms of viewing angle, brightness, uniformity, or contrast. Consequently, there is a need for an improved microlens array.

SUMMARY

Systems and methods are disclosed herein to provide microlens arrays. For example, in accordance with an embodiment of the present invention, a method for manufacturing a microlens array is disclosed. The microlens array may be manufactured without requiring difficult or expensive manufacturing steps as required by some conventional microlens arrays. The microlens array may also meet the design requirements for a display screen, such as for example in terms of brightness and uniformity, contrast, and/or viewing angle. For example, the microlens array may be utilized as a television screen, a computer screen (e.g., computer monitor), a photocopy screen, a projection screen, a display screen (e.g., ranging from a cellular phone display screen to a wall-sized display screen), a laptop screen, or with various other types of imaging, optical, or display systems.

In accordance with an embodiment of the present invention, for example, a method is provided for manufacturing a microlens array. The method includes adhering or binding together a bundle of optically transparent members, such as rods or fibers. The bundle of optically transparent members is cut to form sheets of member segments. The cross-section or faces of the sheet may resemble a honeycomb-like structure. The faces may be polished to smooth out any rough edges created by the cutting process. If desired, one or both faces or ends of the sheets can be modified to shape the ends into a desired shape.

The modified ends are exposed to an energy source, such as a heat source, electrical spike, laser light and the like, which causes the end of each member segment to form a lens segment. A light-shielding layer may be placed over the modified ends on one side or both sides of the sheet, leaving, for example, the lens segment of each member segment only partially exposed (e.g., only a central portion of each lens segment allowing light through). One or more coatings may be applied on both sides or on only one side of the sheet (e.g., an anti-reflection coating and/or an anti-glare coating). The resulting microlens array may provide a display screen for various applications (e.g., a small display screen for a camera, a personal digital assistant, or a laptop up to a large display screen for a projection screen, a wall-sized display screen, or a billboard-sized display screen).

Thus, the microlens array manufactured by the method of the present invention can be made small or large. For example, the size of the microlens array can be made from less than about 10 μm square to greater than a 70 in.×70 in. wall display unit. Unlike other microlens array manufacturing methods, each lens element is made with a high degree of lens size uniformity. As described in further detail below, the lens element arrangement in the array can be fixed as desired or to satisfy the requirements of different applications.

More specifically, in accordance with an embodiment of the present invention, method for manufacturing a microlens array includes providing a bundle of optically transparent members; cutting the bundle of optically transparent members to form at least one sheet of optically transparent member segments; heating the at least one sheet of optically transparent member segments to form lens segments; and covering a portion of at least one the lens segments with a light-shielding layer.

In accordance with another embodiment of the present invention, a display screen includes optically transparent members formed as one or more microlens array sheets and adapted to provide a pathway for light, wherein each of the optically transparent members has a lens formed on at least one end of the optically transparent member; and a light-shielding layer disposed adjacent to the sheet and adapted to block a portion of the light leaving each of the optically transparent members.

In accordance with another embodiment of the present invention, a method for providing a display screen formed as a microlens array includes providing optically transparent cylindrical rods bundled together to form a structure having a honeycomb-like cross section; cutting the bundle of optically transparent cylindrical rods to form at least one sheet of optically transparent rod segments, each optically transparent rod segment having a first end and a second end and adapted to channel light; heating both ends to form a lens surface on said ends; and covering a portion of the lens surface on the first ends with a light-shielding layer.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
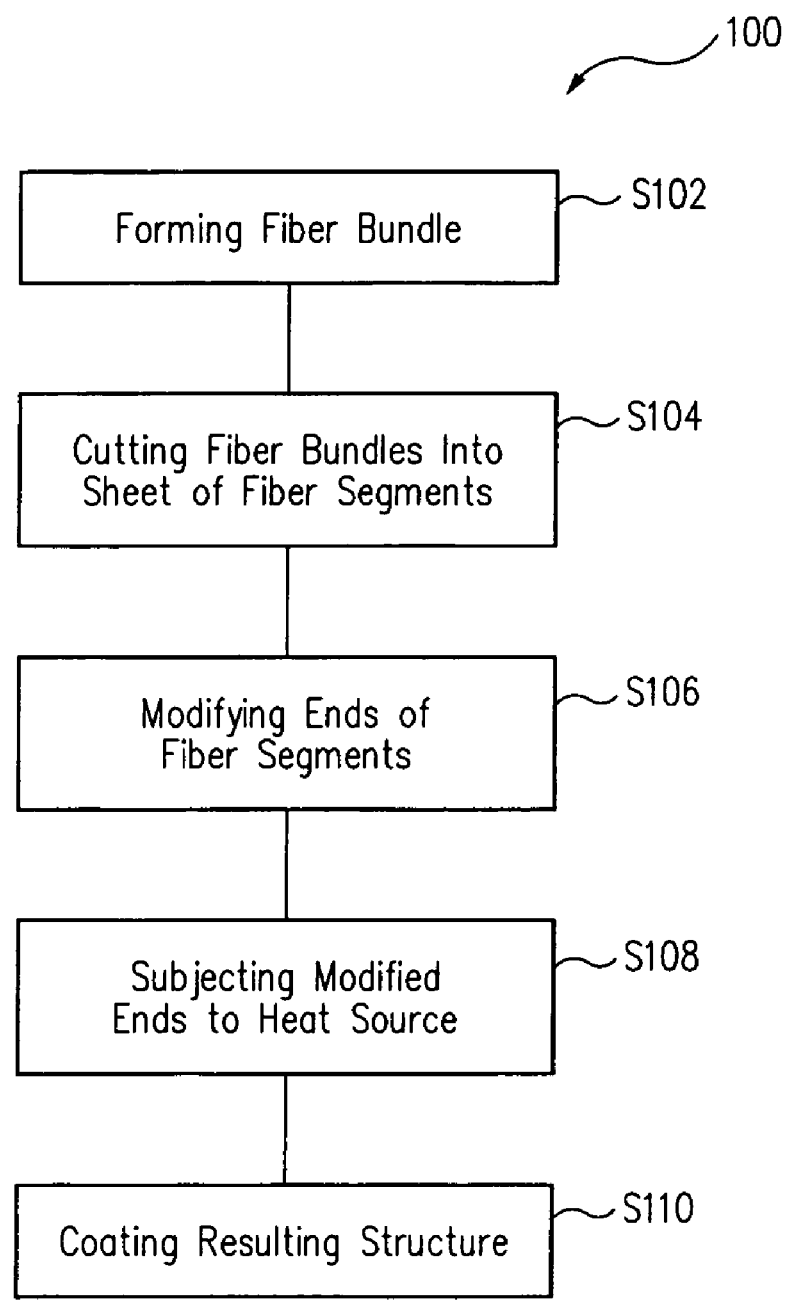
FIG. 1 is a flowchart illustrating a method in accordance with an embodiment of the present invention.

FIG. 1 is a flowchart illustrating a method 100 in accordance with an embodiment of the present invention. Method 100 includes providing a bundle of optically transparent members, such as optically transparent rods or fibers made for example of glass, plastic and the like (s102). The bundle of optically transparent members is cut or sliced into a sheet or sheets of optically transparent member segments (s104), where each sheet has a first face and a second face. The thickness of each sheet can be made to any desired thickness, as desired or depending upon application requirements.

The ends of each optically transparent member segment in each sheet can be polished so as to create a smooth end (s106). Method 100 may also include modifying one or both faces of the sheets (s106) to form the face of the sheet into a surface that varies from a flat surface to a more rounded surface. Optionally, the end of each transparent member segment can be modified (s106) so as to create variable sized and shaped lens structures during the lens element formation process.

As described in greater detail below, one or both faces of each sheet of optically transparent member segments are subjected to an energy source that can provide a heating treatment, which causes a lens element to form on the end or ends of the optically transparent member segments (s108). In addition, the newly formed array of lens elements can be coated (s100), if desired, using for example a thin film. The coating can include an anti-reflection or anti-glare material for display screen applications.

Figure 2:
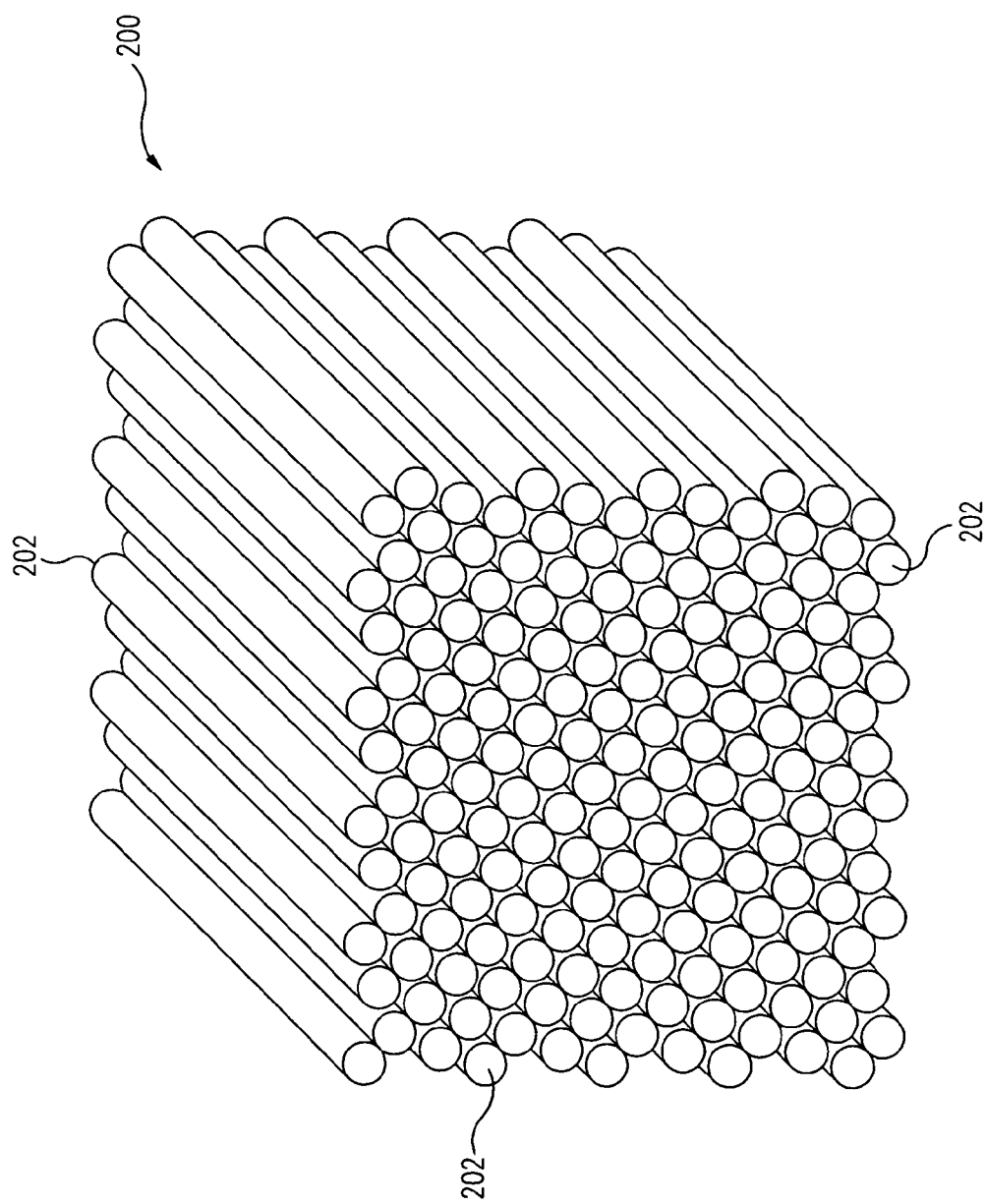
FIG. 2 is a simplified illustration of a bundle of optically transparent members in accordance with an embodiment of the present invention.

FIG. 2 is a simplified illustration of a bundle 200 of a plurality of optically transparent members 202 in accordance with an embodiment of the present invention. In one embodiment, each optically transparent member 202 can be a rod, cylinder, fiber or other similarly shaped member that can provide a pathway for light. The plurality of optically transparent members 202 is bound together (s102) along a longitudinal axis of each member. The resulting structure has a cross-section which resembles a honeycomb-like structure.

In one embodiment, optically transparent members 202 can be bound together to form bundle 200 using any suitable adhesive, such as an ultraviolet (UV) curable adhesive and the like. Beneficially, when using a UV curable adhesive to form bundle 200 of optically transparent members 202, any gaps that may exist between the members are filled with the adhesive before the adhesive is cured. Alternatively, bundle 200 can be formed during a drawing/polling process.

Optically transparent members 202 can be made of a variety of materials. For example, in one embodiment, optically transparent members 202 are made of glass ($SiO_2$), plastic, polymer wires or other similar optically transparent materials. The diameter and length of each optically transparent member 202 that make up bundle 200 are generally dictated by the application.

In one embodiment, for example, when manufacturing a microlens array, the thickness of bundle 200 (i.e. the length of members 202) is made greater than or at least equal to a desired thickness of the microlens array required by the application. For example as shown in FIG. 3A, to ensure the proper thickness, bundle 200 can be cut (s104) into a single layer or sheet 300 to form an array of optically transparent member segments 302 having a thickness t. Accordingly, the length of optically transparent members 202 should be greater than or equal to t. Bundle 200 can be cut into sheet 300 or multiple sheets 300 using conventional cutting technologies, such as for example by employing dicing saws and/or cutting wheels.

In one embodiment, for example, when providing a microlens array for an imaging system, such as a camera, the thickness of each sheet 300 of optically transparent member segments 302 can be about 100 $\mu$m, where for an image projection system using a light integrator the thickness may approach several millimeters or more.

In one embodiment, each optically transparent member 202 in bundle 200 can be standard single mode fiber, which has a core size of 9 $\mu$m and an overall diameter of about 125 $\mu$m. In general, the diameter of each optically transparent member 202 can range, for example, from between about less than 1 to about several millimeters depending on the application. In general, pre-bundled optically transparent members 202 of FIG. 2 designed to desired specifications to suit specific applications are commercially available, for example, from Corning, Inc. of New York.

Figure 7A:
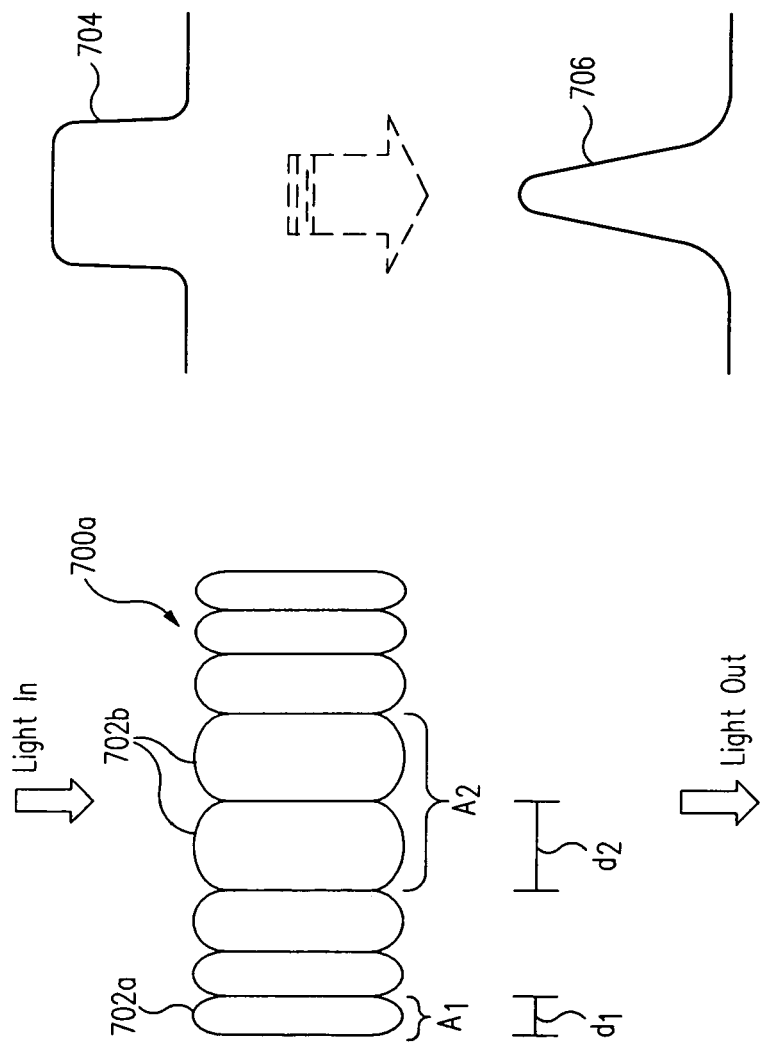
FIGS. 7A and 7B are simplified side view illustrations of a bundle of optically transparent members in accordance with an embodiment of the present invention.
Figure 7B:
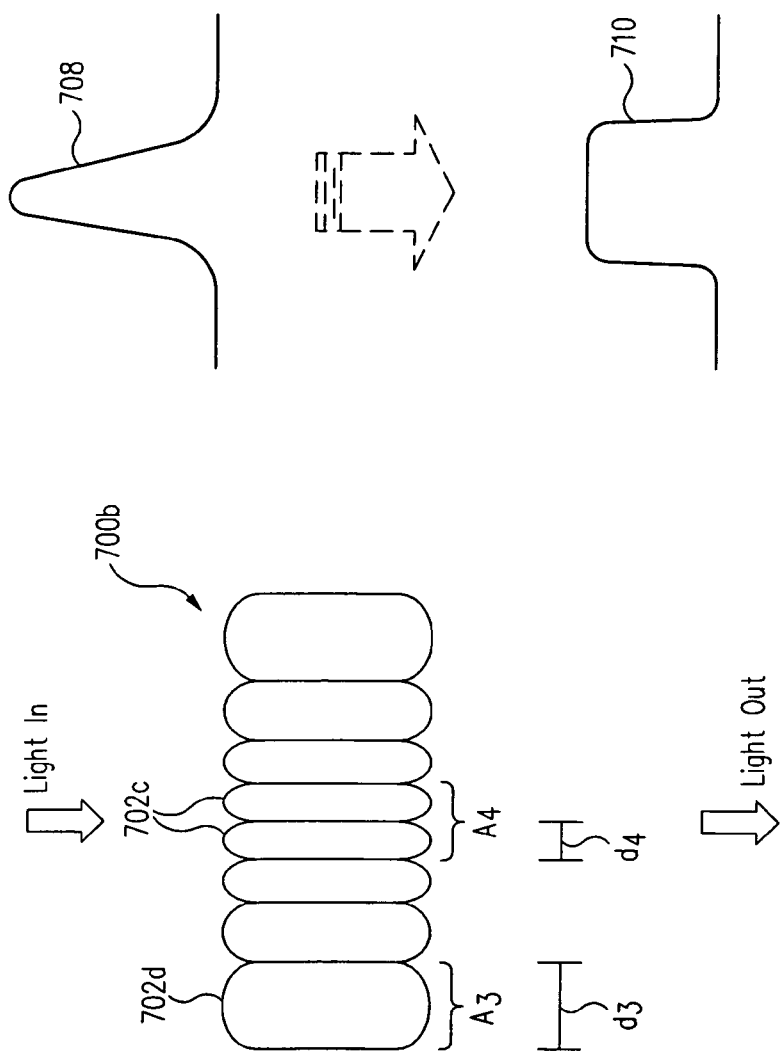

FIGS. 7A and 7B are simplified side view illustrations of a bundle 700 (i.e., a bundle 700a and a bundle 700b for FIGS. 7A and 7B, respectively) in accordance with embodiments of the present invention. In one embodiment, bundle 700a can be made to include optically transparent members having individually varying diameters. For example, in FIG. 7A bundle 700a is shown having optically transparent members 702a with a diameter $d_1$ and optically transparent members 702b with a diameter $d_2$, where $d_2$ is greater than $d_1$. In this embodiment, optically transparent members 702a are disposed on a peripheral area $A_1$ of bundle 700a and optically transparent members 702b are disposed in a core area $A_2$ of bundle 700a.

In this example, the beam intensity of a light input 704 directed into a microlens array formed from bundle 700a in accordance with the principles of the present invention can be expected to be redistributed as shown in an intensity curve 706. Redistribution of the light intensity is useful in systems, such as image projection systems, cameras and the like.

FIG. 7B shows bundle 700b having optically transparent members 702c having a diameter $d_4$ and optically transparent members 702d having a diameter $d_3$, where $d_3$ is greater than $d_4$. In this embodiment, optically transparent members 702d are disposed on a peripheral area $A_3$ of bundle 700b and optically transparent members 702c are disposed in a core area $A_4$ of bundle 700b.

In this example, the beam intensity of a light input 708 directed into a microlens array formed from bundle 700b in accordance with the principles of the present invention can be expected to be redistributed as shown in an intensity curve 710.

Figure 3B:
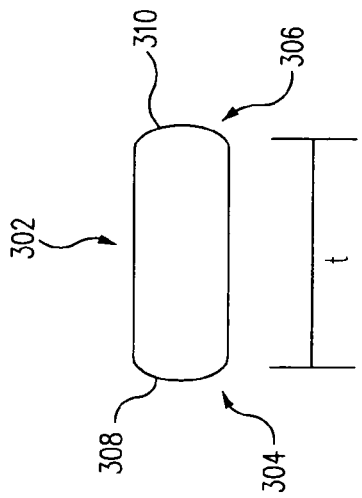
FIG. 3B is a side view of a single optically transparent member segment in accordance with an embodiment of the present invention.
Figure 3A:
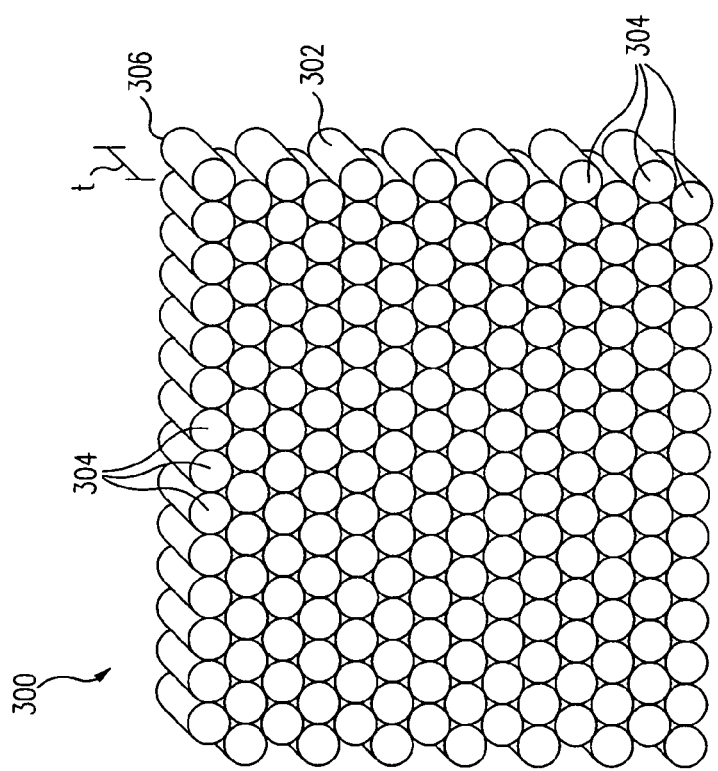
FIG. 3A is a simplified representation of a cut sheet of optically transparent member segments taken across the bundle of FIG. 2 in accordance with an embodiment of the present invention.

As shown in FIGS. 3A and 3B, once sheet 300 of optically transparent member segments 302 is cut to a desired thickness t, ends 304 and 306 may be modified. In one embodiment, the ends or faces 304 and 306 of cut sheet 300 can be polished or otherwise "cleaned" to form a smooth flat surface on one or both ends of sheet 300.

In another embodiment, the polishing can be used to modify the curvature, size, and related parameters of each face 304 and 306 of sheet 300 to form and optimize a desired microlens array surface on one or both faces of sheet 300. The shape of the array surface may be determined by the desired application.

Figure 6A:
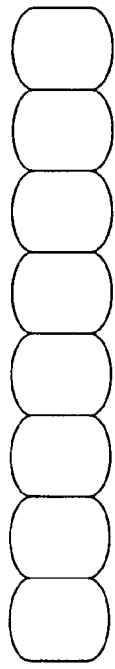
FIGS. 6A, 6B, 6C and 6D are simplified side views of various configurations of microlens arrays in accordance with an embodiment of the present invention.
Figure 6B:
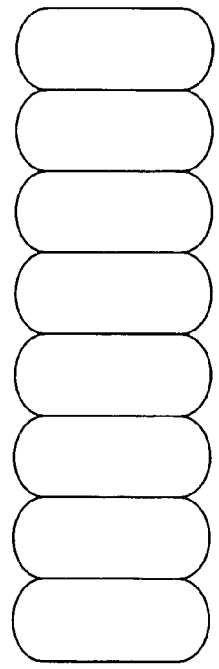
Figure 6C:
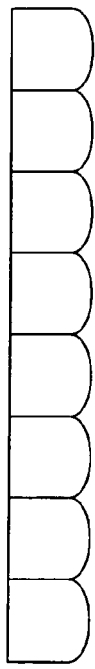
Figure 6D:
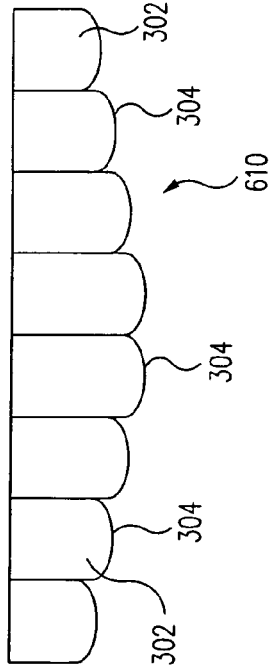

For example, referring briefly to FIG. 6D, a simplified illustration shows an embodiment of a microlens array 608 with lenses formed in a curved manner on one surface (i.e., a surface 610). In one embodiment, the curvature of surface 610 of array 608 can be controlled during the polishing process. For example, the polishing arm can be allowed to swing while rotating array 608, thus forming a curved surface of member segments 302 on face 304.

The individual shape of the ends 304 and 306 (FIG. 3B) of each optically transparent member segment 302 can also be adjusted or modified to create the curvature, size, and parameters of each optically transparent member segment 302 (s106). The modifications can be accomplished using various techniques including polishing, etching, acid etching and the like.

Figure 8A:
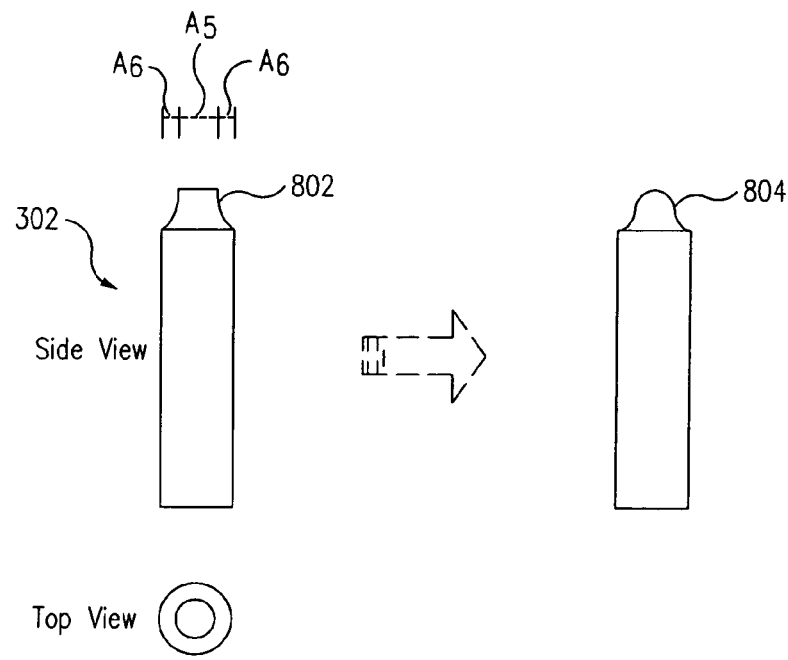
FIGS. 8A and 8B show simplified illustrations of standard cut optically transparent member segments undergoing an etch process in accordance with an embodiment of the present invention.

In one embodiment, for example, each end 304 and 306 can be modified into various shapes by etching a peripheral area of each member segment 302. For example, FIG. 8A shows a fiber segment 302 etched, such that a core area $A_5$ is raised above a peripheral area $A_6$ to form etched member segment 802 that can result in a more highly curved lens element 804 when heat is applied thereto as described below.

Figure 8B:
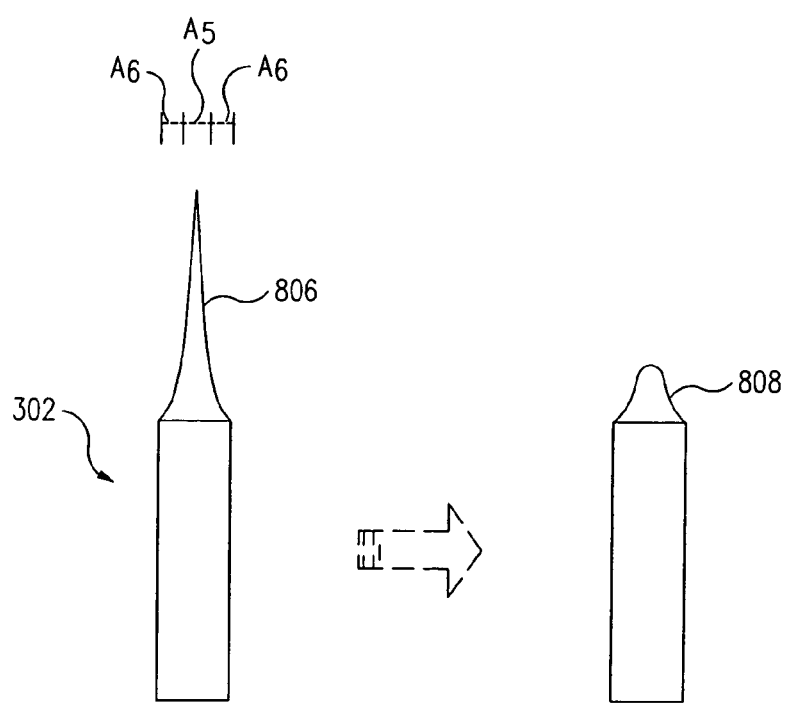

In another embodiment, shown in FIG. 8B, the etching of member segment 302 is increased to form a substantially pointed area in the core area $A_5$ and steeper slopes in peripheral area $A_6$ of etched member segment 806 that can result in an even more highly curved lens element 808 when heat is applied thereto as described below.

In one embodiment, the etching process described above can be accomplished by placing ends 304 and 306 into a hydrofluoric (HF) acid bath for a specific duration of time. The acid bath affects the peripheral area $A_6$ before it affects the core area $A_5$, thus the longer the optically transparent member 302 is held in the HF acid bath, the more severe is the etch (i.e. the steeper the slope of the etched area). Beneficially, for example, optically transparent member segments with etched ends may form lenses with shorter focal lengths and may improve light focusing.

Figure 4A:
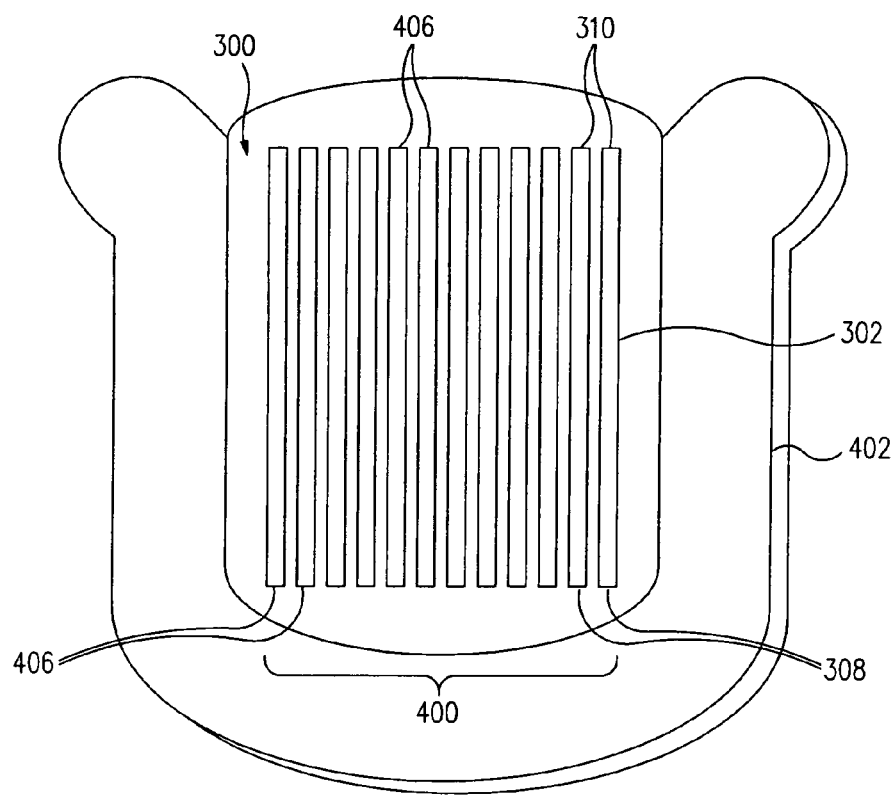
FIG. 4A is a simplified side view illustration of an array of optically transparent member segments subjected to a heating treatment in accordance with an embodiment of the present invention.

As shown in FIG. 4A, surfaces 308 and/or 310 of the array of optically transparent member segments 302 that form sheet 300, whether etched or not, may be subjected to an energy source, which causes heating (s108) to form lens elements 406, which together form microlens array 400.

Figure 9:
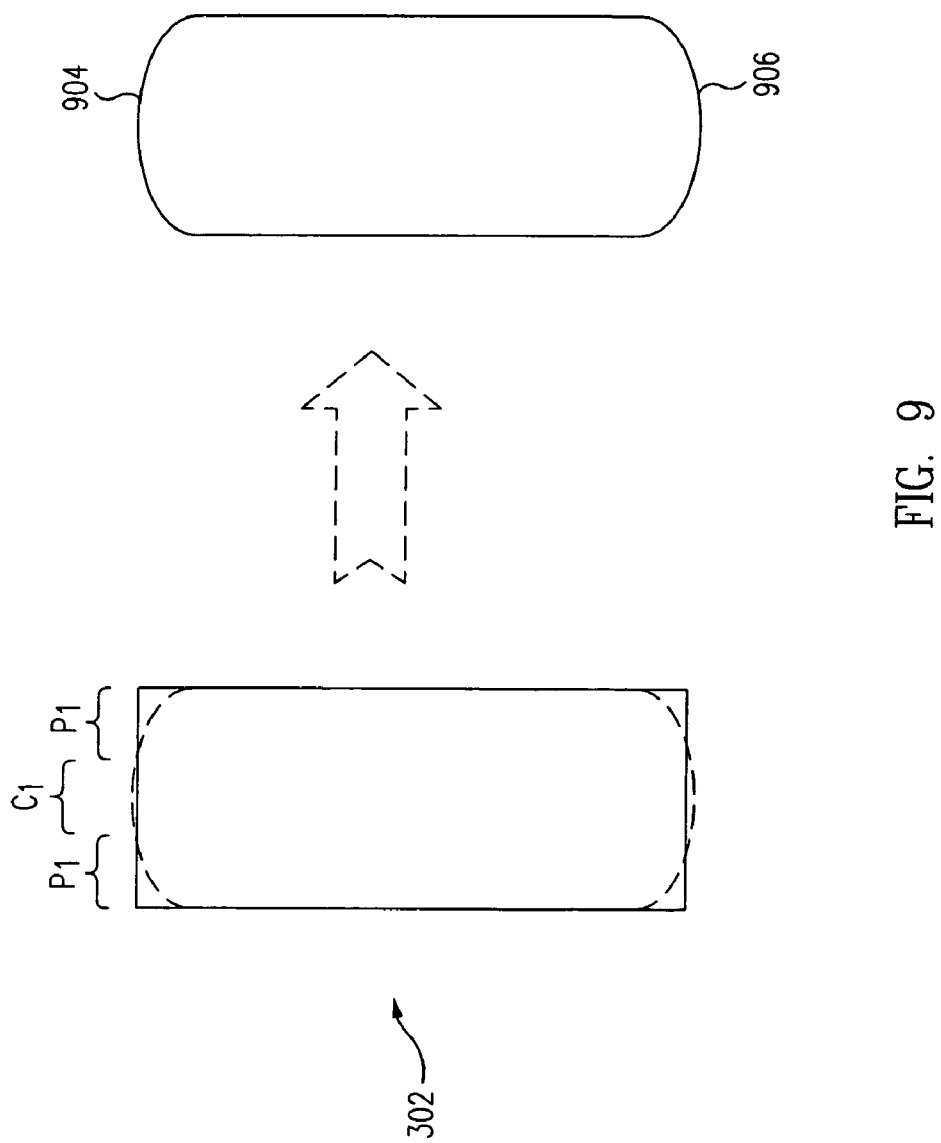
FIG. 9 is a simplified illustration of an optically transparent member segment undergoing a heat treatment in accordance with an embodiment of the present invention.

As illustrated in FIG. 9, the heat treatment causes a peripheral area $P_1$ of each member segment 302 to soften or melt faster than a core area $C_1$. The surface tension created by the unequal melting, causes curved surfaces to form at the ends of the member segment producing lens elements 904 and 906.

The heat treatment can be carried out using any suitable heat generation means including equivalents of the embodiments described herein. For example, referring again to FIG. 4A, in one embodiment, the array of optically transparent member segments 302 can be placed into a furnace 402. Furnace 402 is capable of providing a heating level which may allow for the heat treatment to be accomplished for any given optically transparent member segment material. The heat treatment causes the formation of lens elements 904 on surfaces 308 and/or the formation of lens elements 906 on surfaces 310, if desired.

Figure 4B:
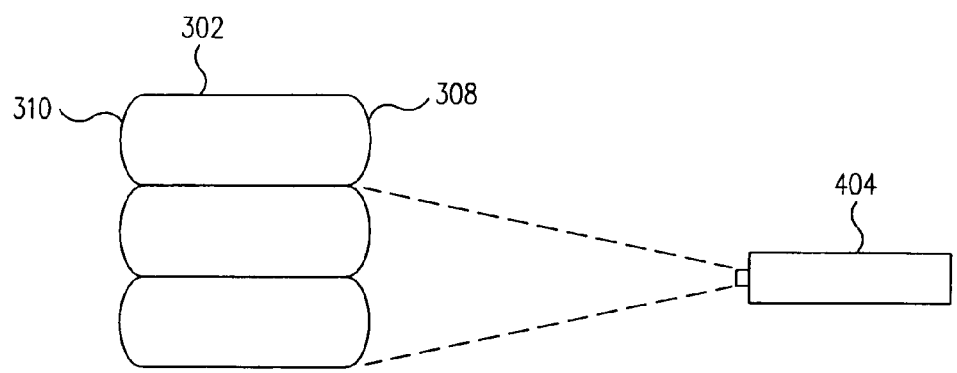
FIG. 4B is a simplified side view illustration of an array of optically transparent member segments subjected to a heating treatment in accordance with an embodiment of the present invention.

In yet another embodiment, as shown in FIG. 4B, the heat treatment can be accomplished by scanning surfaces 308 and/or 310 with a laser 404 (e.g., a high-powered laser) using a wavelength that can be absorbed by the optically transparent member segment material to heat the material and form lens elements 904 and/or 906. In other embodiments, the energy source which provides heating can be an electrical spark/arc or a glow discharge placed near the ends of optically transparent member segments or by application of other known energy sources.

FIG. 3B is a side view of a single optically transparent member segment 302 in accordance with an embodiment of the present invention. In this embodiment, end 304 of optically transparent member segment 302 can be modified by the heating process to have different radii of curvature in two mutually perpendicular or other different directions. The particular illustration in FIG. 3B shows a curved surface 308 on end 304, such as an oval, semi-oval, plano/convex asphere and the like shaped lens surface, which can provide different optical performance in different optical axes relative to a major axis of the lens surface.

In one embodiment, end 306 can also be modified to either be made flat or to have different radii of curvature in two mutually perpendicular or other different directions. FIG. 3B shows a curved surface 310 on end 306, such as an oval or semi-oval shaped lens surface, which can provide different optical performance in different optical axes relative to the major axis of the lens surface.

The pitch and size of the microlens array can also be adjusted based on the requirements of the particular application. Manufacturing specifications and tolerances for microlens arrays are typically governed by the specific application and may be defined by the end user accordingly.

In one example, using a method in accordance with an embodiment of the present invention, a microlens array may be made with a focal length non-uniformity or variation of less than 5% across the entire array, using standard single mode fiber having a diameter of about 125 $\mu$m.

Figure 5:
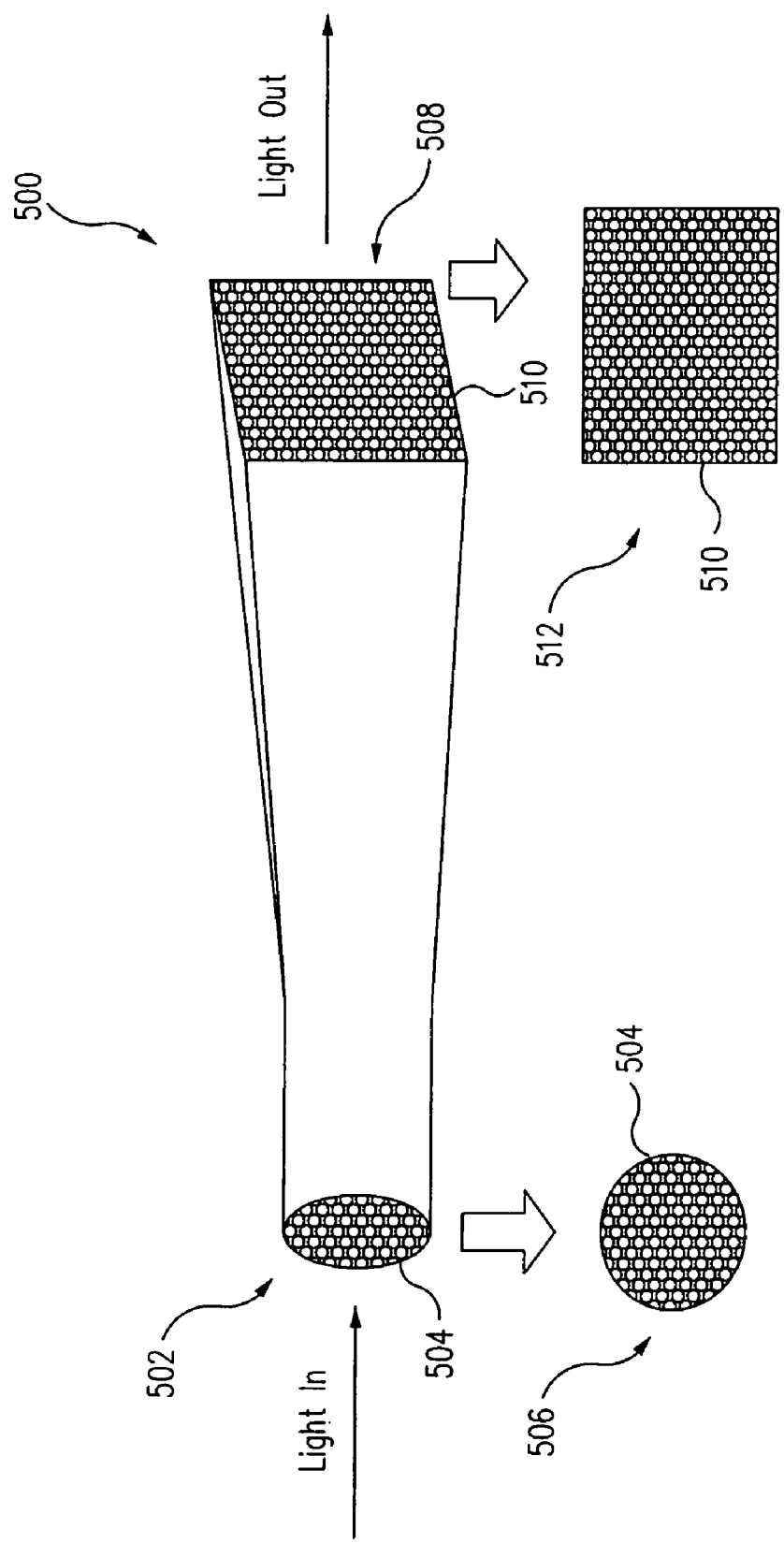
FIG. 5 is a simplified illustration of a light beam shape converter and light interpreter used in a projection system including microlens arrays in accordance with an embodiment of the present invention.

FIG. 5 illustrates an example of an application for microlens arrays made using a method in accordance with an embodiment of the present invention. The example includes a projection system 500 which can include multiple microlens arrays of variable sizes and shapes designed for a specific application. In one embodiment, light enters projection system 500 at a first end 502 having a first microlens array 504 with a first shape 506, such as for example a round shape. The light exits projection system 500 at a second end 508 through a second microlens array 510 with a second shape 512, such as for example a rectangular shape. As should be understood from this example, the shapes and sizes of the microlens arrays can be made as desired for any application with methods disclosed herein in accordance with one or more embodiments of the present invention.

Furthermore, if necessary or desired, lens elements 406 (FIG. 4A) of microlens array 400, in accordance with an embodiment of the present invention, can be coated (s110). In one embodiment, such as for example for a display screen application, microlens array 400 can be coated with an anti-reflection coating and/or an anti-glare coating. The coatings applied to microlens array 400 can be applied by well known techniques, such as sputtering, deposition, evaporation, spraying, dipping, spinning, rolling and the like.

As previously mentioned in accordance with one or more embodiments of the present invention, a thickness t for a microlens array may be varied as can the size and shape of the lens surfaces and the number of lens sides, depending on the application or specifications. For example, FIG. 6A provides a simplified illustration showing an embodiment of a microlens array 602 having lenses formed on both sides. The thickness t of microlens array 602 may be made any desired thickness, such as for example a small thickness with t between about 100 $\mu$M and about 1 millimeter or a large thickness with t greater than 1 millimeter.

FIG. 6B provides a simplified illustration showing an embodiment of a microlens array 604 having lenses formed on both sides; however, for this example the thickness t is considered large (e.g., greater than 1 millimeter). It should be understood from these embodiments, that the thickness t can be made any thickness, as desired. FIG. 6C provides a simplified illustration showing an embodiment of a microlens array 606 having lenses formed on one side only in accordance with an embodiment of the present invention. FIG. 6D is similar to FIG. 6C, with lenses formed on one side only, but as discussed above, surface 610 has a curved surface.

One or more embodiments of the present invention described herein are described for use with optically transparent members of a cylindrical shape arranged in a bundle. However, it should be understood by those of ordinary skill in the art that the principles of the present invention are not limited to cylindrical shapes and can apply to optically transparent members having other shapes, such as for example rectangular, square, or hexagonal.

In accordance with an embodiment of the present invention, a microlens array may be provided as described herein and employed, for example, as a display screen. For example, a microlens array may be provided as described herein for method 100 (e.g., s102 through s110), with additional manufacturing operations performed which may improve the performance or qualities of the microlens array when utilized as a display screen.

Figure 10:
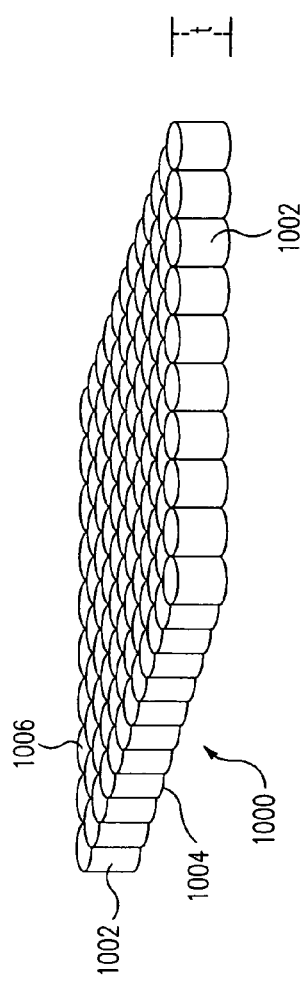
FIG. 10 is a simplified representation of a sheet of optically transparent member segments in accordance with an embodiment of the present invention.

For example, FIG. 10 provides a simplified representation of a microlens array sheet 1000 of optically transparent member segments 1002 in accordance with an embodiment of the present invention. Sheet 1000, for example, may have been formed according to method 100 (e.g., s102 through s108) or by or including alternative corresponding operations as described herein.

Thus, sheet 1000, for example, was formed by being sliced from a bundle of optically transparent members or light rods (e.g., such that sheet 1000 is approximately the desired thickness t), with sides 1004 and 1006 of sheet 1000 polished (and/or modified) and heat treated to form lenses on each end of optically transparent member segments 1002. Sheet 1000 may be employed as a display screen or further operations may be performed on sheet 1000, which may improve the performance or qualities of sheet 1000 when utilized as a display screen.

As an example, a light-shielding layer may be disposed on side 1004 and/or side 1006 to block a portion of light passing through one or more optically transparent member segments 1002 (e.g., blocking light around a lens periphery of each optically transparent member segment 1002). The light-shielding layer (e.g., a black-colored layer) may be a metal or other type of material which is deposited, adhered to, applied, sprayed, or otherwise disposed onto side 1004 and/or side 1006 of sheet 1000. The light-shielding layer operation may be included as an operation of method 100 (e.g., s110 of method 100 of FIG. 1).

Figure 11:
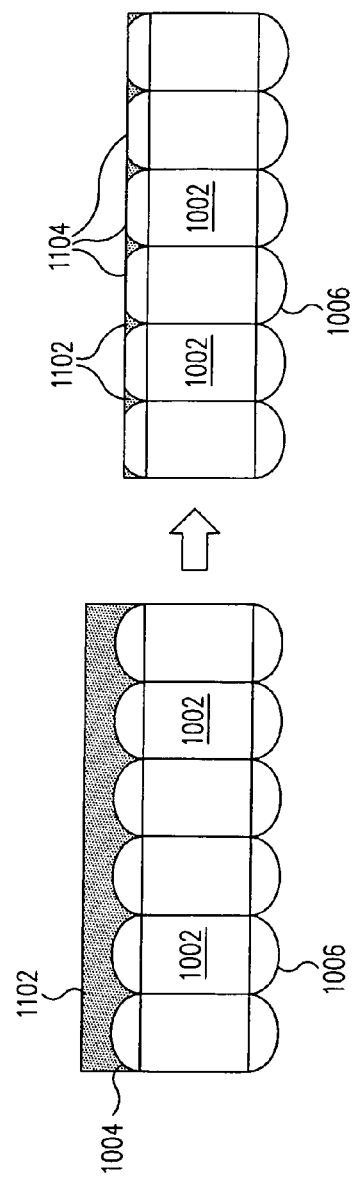
FIG. 11 is a simplified side view illustration of an array of optically transparent member segments having a light-shielding layer applied in accordance with an embodiment of the present invention.

For example, FIG. 11 is a simplified side view illustration of optically transparent member segments 1002 having a light-shielding layer 1102 applied in accordance with an embodiment of the present invention. For example, layer 1102 may be deposited entirely over lenses 1104 of optically transparent member segments 1002 (e.g., on side 1004). Lenses 1104 of optically transparent member segments 1002 may then be partially exposed, for example by etching or back-polishing or other techniques depending upon the material utilized for layer 1102 to remove a portion of layer 1102.

Lenses 1104 may thus be partially exposed, for example, at a central or a core region of each lens 1104 while layer 1102 remains to block light around a periphery region of each lens 1104. The etching, back-polishing, or other techniques utilized may also flatten each lens 1104, as illustrated in FIG. 11. Thus, FIG. 11 illustrates sheet 1000 (i.e., a microlens array) having an integrated light shield. It should also be noted that FIG. 11 is an illustration and that the dimensions shown for layer 1102 and optically transparent member segments 1002 may be shown with dimensions exaggerated or distorted for clarity and to aid in understanding one or more aspects of an embodiment of the present invention.

A coating (e.g., a thin film coating) may be applied to side 1006 and/or side 1004 of sheet 1000 after application of layer 1102. For example, a thin film coating, such as for example an anti-reflection coating and/or an anti-glare coating, may be applied to side 1004 (e.g., the light output side). The coating may serve to reduce reflections and/or glare and may also serve to protect sheet 1000 (e.g., from scratches or other damage). The coating may be applied as part of method 100 (e.g., s110 of method 100 of FIG. 1).

Various types of coatings, such as those known by one skilled in the art, may be applied, depending upon the desired result or application requirements. For example, the coating material may be selected from $SiO_2$, $Si_3N_4$, or $TiO_2$ or any combination of these or other conventional coating materials. As an example, the selected coating materials may be employed to form a multi-layer thin film coating configuration.

Figure 12:
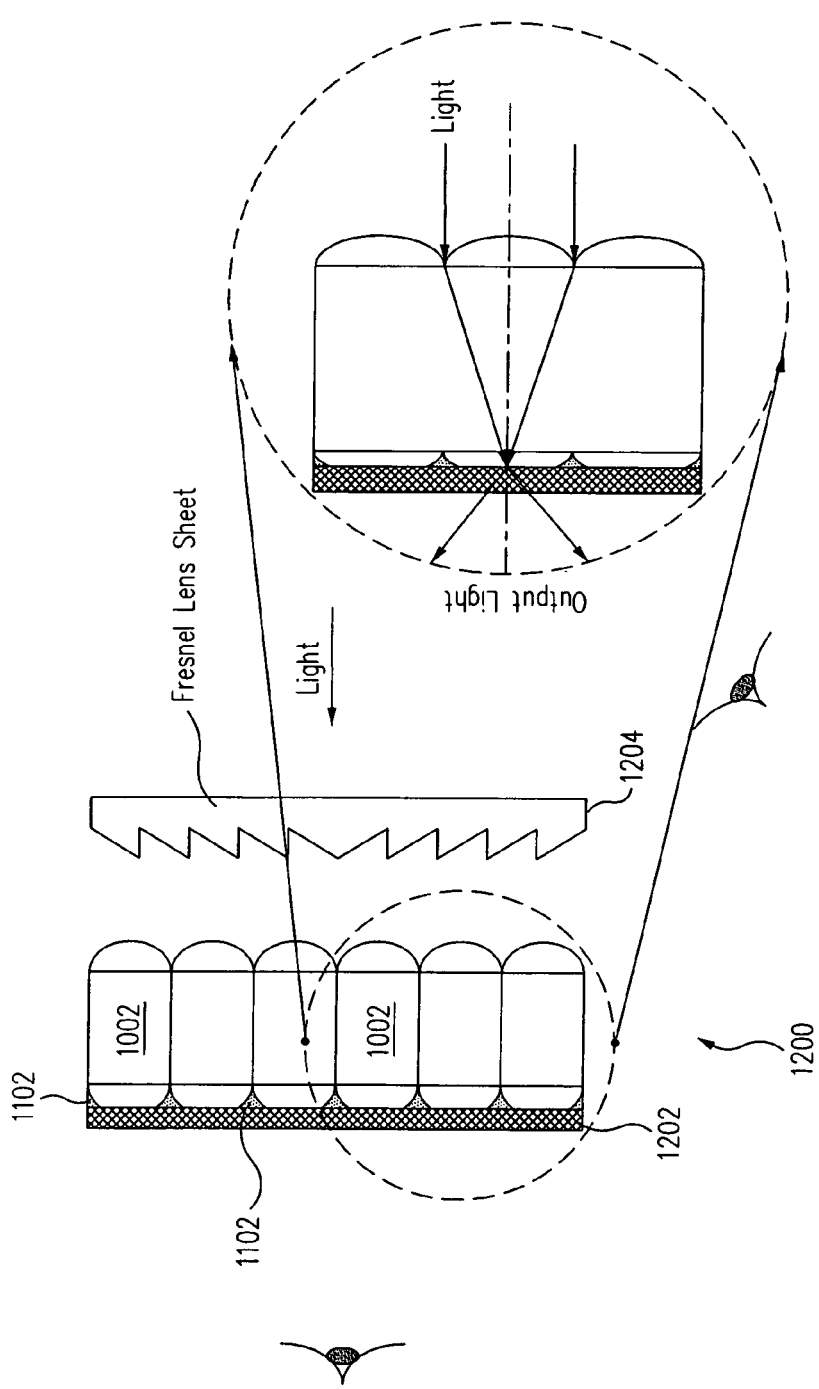
FIG. 12 is a simplified representation of a sheet of optically transparent member segments employed in a display screen in accordance with an embodiment of the present invention.

Sheet 1000, with for example layer 1102 as described in reference to FIG. 11, may be employed as a display screen, as disclosed herein. For example, FIG. 12 provides a simplified representation of a display screen 1200 in accordance with an embodiment of the present invention. Display screen 1200, for example, includes sheet 1000 with optically transparent member segments 1002 and light-shielding layer 1102 (e.g., around the lens periphery of optically transparent member segments 1002).

Display screen 1200 may also include a coating 1202 (e.g., a thin film coating as disclosed herein). A sheet 1204, such as for example a Fresnel lens sheet, may also be included. As shown in FIG. 12, light is provided, which passes through display screen 1200 to be viewed on the other side. By utilizing techniques disclosed herein, the resulting output light (i.e., the resulting light after passing through display screen 1200) may have superior qualities or performance as compared to conventional display screens.

As described herein, various embodiments of microlens arrays are disclosed. For example, in accordance with an embodiment of the present invention, a microlens array is disclosed which may be utilized to provide a high-quality display screen. The display screen may be inexpensive to manufacture relative to some conventional display screens. Furthermore, the display screen may offer improved performance relative to some conventional display screens, such as for example in terms of brightness and uniformity, contrast, and/or viewing angle.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method for manufacturing a microlens array comprising:

providing a bundle of optically transparent members;

cutting the bundle of optically transparent members to form at least one sheet of optically transparent member segments;

heating the at least one sheet of optically transparent member segments to form individually curved lens segments; and covering a portion of at least one of the lens segments with a light-shielding layer.

2. The method of claim 1, wherein the microlens array forms at least a portion of a display screen.

3. The method of claim 2, wherein the display screen is part of a camera, a personal digital assistant, a telephone, a laptop, a computer monitor, a television, a photocopy screen, a projection screen, or a billboard.

4. The method of claim 1, further comprising coating at least one of the lens segments.

5. The method of claim 4, wherein the coating comprises an anti-reflection coating and/or an anti-glare coating.

6. The method of claim 1, further comprising providing a Fresnel lens sheet, wherein light passing through the lens segments will also pass through the Fresnel lens sheet.

7. The method of claim 1, wherein a diameter of one or more of the optically transparent members is different than some of the optically transparent members within the bundle of optically transparent members.

8. The method of claim 7, wherein the diameters of the optically transparent members at a periphery of the bundle are different than the diameters of the optically transparent members in a core area of the bundle.

9. The method of claim 1, further comprising modifying at least one end of the optically transparent member segments.

10. The method of claim 9, wherein the modifying comprises modifying both ends of said optically transparent member segments.

11. The method of claim 1, wherein the providing comprises adhering the optically transparent members together using an adhesive to form a honeycomb-like structure.

12. The method of claim 1, wherein the optically transparent members are made of a glass, a polymer, and/or a plastic.

13. The method of claim 1, wherein the lens segments comprise a convex, a concave, or a planer lens surface.

14. The method of claim 1, wherein the heating comprises heating both ends of each optically transparent member segment to form a lens surface thereon.

15. The method of claim 1, wherein the at least one sheet has a thickness of between about 100 $\mu$m and 2 mm.

16. A display screen comprising:
   optically transparent members formed as one or more microlens array sheets cut from a bundle of optically transparent members and adapted to provide a pathway for light, wherein each of the optically transparent members has a individually curved lens formed on at least one end of the optically transparent member; and
   a light-shielding layer disposed adjacent to the sheet and adapted to block a portion of the light leaving each of the optically transparent members.

17. The display screen of claim 16, further comprising a thin-film coating covering the lens of at least one of the optically transparent members.

18. The display screen of claim 16, further comprising a Fresnel lens sheet, wherein the light passing through the lens of at least one of the optically transparent members will also pass through the Fresnel lens sheet.

19. The display screen of claim 16, wherein the display screen is part of a camera, a personal digital assistant, a telephone, a laptop, a computer monitor, a television, a photocopy screen, a projection screen, or a billboard.

20. The display screen of claim 16, wherein a diameter of one or more of the optically transparent members is different than other ones of the optically transparent members.

21. The display screen of claim 16, wherein the optically transparent members are made of a glass, a polymer, and/or a plastic.

22. The display screen of claim 16, wherein the microlens array sheet has a thickness of between about 100 $\mu$m and 2 mm.

23. A method for providing a display screen formed as a microlens array, the method comprising:
   providing optically transparent cylindrical rods bundled together to form a structure having a honeycomb-like cross section;
   cutting the bundle of optically transparent cylindrical rods to form at least one sheet of optically transparent rod segments, each optically transparent rod segment having a first end and a second end and adapted to channel light;
   heating both ends to form a lens surface on said ends; and
   covering a portion of the lens surface on the first ends with a light-shielding layer.

24. The method of claim 23, wherein the display screen is incorporated into a camera, a personal digital assistant, a telephone, a laptop, a computer monitor, a television, a photocopy screen, a projection screen, or a billboard.

25. The method of claim 23, further comprising applying a coating over the lens surface on the first ends.

26. The method of claim 23, further comprising providing a Fresnel lens sheet, wherein the light passing through the optically transparent cylindrical rods will also pass through the Fresnel lens sheet.

27. The method of claim 23, wherein a diameter of one or more of the optically transparent cylindrical rods is different than other ones of the optically transparent members within the bundle.

28. The method of claim 23, wherein the providing comprises adhering the optically transparent cylindrical rods together using a UV curable adhesive to form the bundle.

29. The method of claim 23, wherein the optically transparent cylindrical rods are made of a glass, a polymer, or a plastic.

30. The method of claim 23, wherein the lens surface comprises a convex, a concave, or a planer lens surface.

31. The method of claim 23, wherein the at least one sheet of optically transparent rod segments comprises a thickness of between about 100 $\mu$m and about 2 mm.

* * * * *